United States Patent [19]

Kishi et al.

[11] Patent Number: 4,720,796
[45] Date of Patent: Jan. 19, 1988

[54] TOOL INTERFERENCE CHECKING METHOD

[75] Inventors: Hajimu Kishi; Masaki Seki; Takashi Takegahara, all of Tokyo, Japan

[73] Assignee: Fanuc Ltd., Minamitsuru, Japan

[21] Appl. No.: 694,387

[22] PCT Filed: Feb. 20, 1984

[86] PCT No.: PCT/JP84/00053
§ 371 Date: Jan. 7, 1985
§ 102(e) Date: Jan. 7, 1985

[87] PCT Pub. No.: WO84/04479
PCT Pub. Date: Nov. 22, 1984

[30] Foreign Application Priority Data

May 17, 1983 [JP] Japan .................. 58-86468

[51] Int. Cl.⁴ .............................. G05B 19/00
[52] U.S. Cl. .................. 364/474; 364/184; 318/563
[58] Field of Search .......... 364/167, 170, 474, 475, 364/513, 184, 185; 318/572, 632, 563, 565

[56] References Cited

U.S. PATENT DOCUMENTS 4,162,527  7/1979  Kilbane et al. ............... 364/170
4,445,182  4/1984  Morita et al. ............... 364/170
4,482,968  11/1984  Inaba et al. ............... 364/167
4,489,377  12/1984  Mawyer ............... 364/167
4,513,366  4/1985  Munekata et al. ............... 364/167
4,549,270  10/1985  Fukumura et al. ............... 364/474

Primary Examiner—Jerry Smith
Assistant Examiner—John R. Lastova
Attorney, Agent, or Firm—Staas & Halsey

[57] ABSTRACT

A tool interference checking method for checking whether a tool (TL) will interfere with a workpiece (WK) when the tool is transported relative to the workpiece to cut the workpiece on the basis of NC data comprising a number of blocks ($B_1$–$B_5$), characterized by having steps of obtaining tool travelling directions (+X, −Y, +X, +Y, +X) indicated by the NC data in respective blocks, obtaining a tool offset path (TCP) using the tool diameter and NC data, obtaining tool travelling directions (+X, −Y, −X, +Y, +X) in respective blocks of the tool offset path, comparing, for each and every block, the tool travelling direction indicated by the NC data and the tool travelling direction indicated by the tool offset path, and rendering a decision to the effect that tool interference will occur if the tool travelling directions are in non-agreement in at least one block.

2 Claims, 11 Drawing Figures

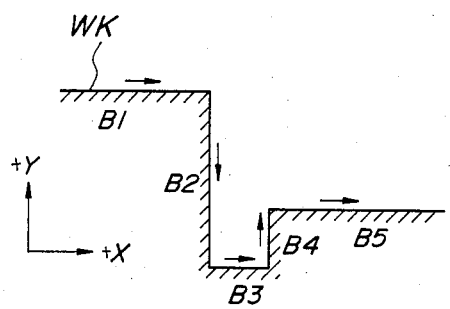
FIG. 1(A)
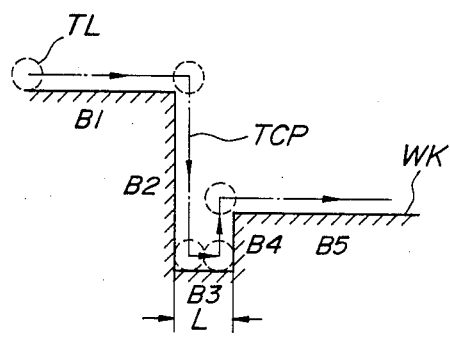
FIG. 1(B)
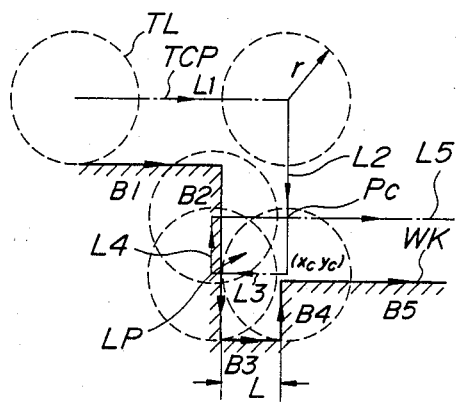
FIG. 1(C)
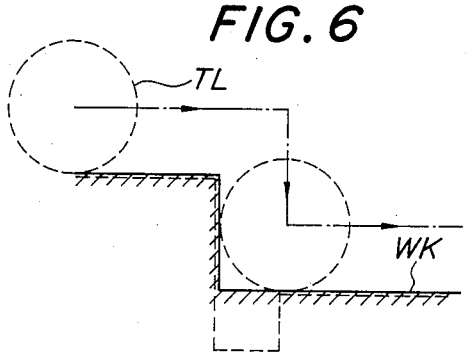
FIG. 6
FIG. 5(A)
| Block Bi | 1 | 2 | 3 | 4 | 5 |
|---|---|---|---|---|---|
| Travelling Direction | +X | −Y | +X | +Y | +X |
FIG. 5(B)
| Block Bi | 1 | 2 | 3 | 4 | 5 |
|---|---|---|---|---|---|
| Travelling Direction | +X | −Y | −X | +Y | +X |

…

TOOL INTERFERENCE CHECKING METHOD

TECHNICAL FIELD

This invention relates to a tool interference checking method and, more particularly, to a tool interference checking method for checking beforehand whether a tool will interfere with a workpiece when the tool is transported relative to the workpiece while offset by the tool diameter to cut the workpiece on the basis of created NC data.

BACKGROUND ART

A numerical control device (referred to as an NC device) moves a tool relative to a workpiece on the basis of previously created NC data to subject the workpiece to numerically controlled machining as commanded. In such numerical control, the trajectory of the tool center does not coincide with the desired machined profile, that is, with the path specified by the NC data, but rather is a path offset, by an amount equivalent to the tool diameter, from the machined profile to the right or left side thereof with respect to the travelling direction. Such a tool center trajectory is calculated automatically by the NC device if the machined profile and tool diameter, as well as a G-instruction for executing the tool diameter offset, are given. The tool is transported along the obtained path of the tool center to finish the workpiece into the desired machined profile. It should be noted that there are also cases where NC data indicative of the path of the tool center (which data are referred to as offset NC data) are created from the abovementioned NC data and tool diameter, and the tool is moved in accordance with the offset NC data to subject the workpiece to the desired machining.

There are situations where, depending upon the machined profile (part profile) and tool diameter, a tool with interfere with the workpiece when the tool is transported along the tool center path obtained by the offset, thereby resulting in damage to the tool or in excessive cutting which makes it impossible to obtain a part having the commanded profile.

It is therefore necessary to check beforehand whether the tool will interfere with the workpiece when cutting is performed while the tool is being offset in accordance with created NC data.

However, a method of checking for tool interference in a simple manner does not exist in the prior art.

SUMMARY OF THE INVENTION

An object of the present invention is to provide a tool interference checking method through which it can be checked, in simple fashion, whether a tool will interfere with a workpiece in a case where the tool is being transported relative to the workpiece to cut the workpiece while being offset by the tool diameter in accordance with created NC data.

Another object of the invention is to provide a method through which NC data can be corrected in a case where tool interference could occur.

The present invention provides a tool interference checking method for checking beforehand whether a tool will interfere with a workpiece when the tool is transported relative to the workpiece while being offset by the tool diameter to cut the workpiece on the basis of created NC data. The tool interference checking method includes checking whether a travelling direction designated by NC data agrees with a travelling direction obtained by a tool diameter offset, and deciding that the tool will interfere with the workpiece when non-agreement is found. Further, in a case where tool interference would occur, the method includes obtaining a closed path, which includes an element in which travelling direction heads backward, from a path obtained by the tool diameter offset, and correcting the NC data in such a manner that the closed path is eliminated.

BRIEF DESCRIPTION OF THE DRAWINGS

FIGS. 1(A)-1(C) are views for describing the present invention in general terms;

FIGS. 5(A) and 5(B) are tables for describing a machined profile and a tool travelling direction on an offset path; and FIG. 6 is a view for describing a machined profile corrected according to the present invention, and a tool offset path.

DESCRIPTION OF THE PREFERRED EMBODIMENT

FIG. 1 is a view for describing the present invention in general terms, FIG. 2 is a view for describing a method of creating a tool offset path.

Let us assume that a desired part profile has the shape shown in FIG. 1(A). In such case, tool travelling directions in respective blocks $B_i$ ($i=1, 2, \ldots 5$) indicated by created NC data are as follows:

$$+X; -Y; +X; +Y; +X \qquad (A)$$

If the diameter of a tool TL is so small as not to exceed a groove width L, then a tool center path TCP for performing the machining illustrated in FIG. 1(A) will be as illustrated in FIG. 1(B) and tool interference will not occur. For the case shown in FIG. 1(B), namely for a case where there is no tool interference, the tool travelling directions in respective blocks $B_i$ ($i=1, 2, \ldots 5$) are based on the tool center path TCP are as follows:

$$+X; -Y; +X; +Y; +X \qquad (B)$$

These agree with the tool travelling directions (A) indicated by the NC data. If the diameter of the tool TL is large enough to exceed the groove width L, however, the tool center path TCP following the tool offset will be as shown in FIG. 1(C), so that the tool TL will interfere with the workpiece WK and result in excessive cutting and in uncut portions. For the case shown in FIG. 1(C), namely for a case where tool interference occurs, the tool travelling directions in respective blocks $B_i$ ($i=1, 2, \ldots 5$) in accordance with the tool center path TCP are as follows:

$$+X; -Y; -X; +Y; +X \qquad (C)$$

Thus, in terms of the travelling direction in block $B_3$, there is a difference from the tool travelling direction in (A) indicated by the NC data. In short, a travelling direction indicated by NC data will not agree with a travelling direction indicated by a path obtained from a tool offset if tool interference occurs, but a travelling direction indicated by NC data will be in complete agreement with a travelling direction indicated by a tool offset path if tool interference does not occur.

Figure 2A:
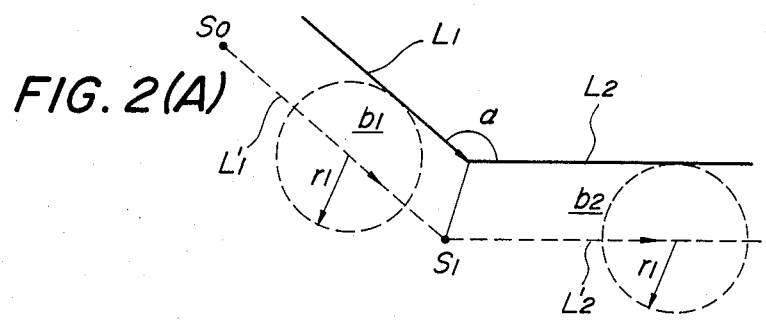
FIGS. 2(A) and 2(B) are views for describing a method of creating a tool offset path.
Figure 2B:
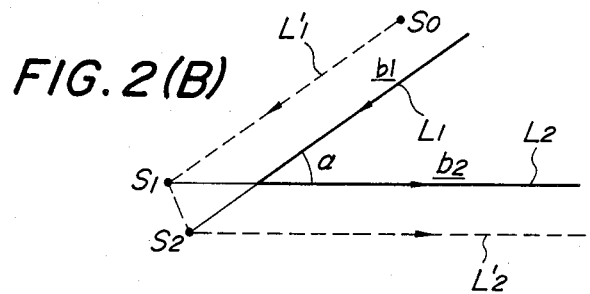

In a case where tool interference occurs, the tool offset path always has a loop LP that includes an element $L_3$ in which the travelling direction heads backward. If this loop is eliminated, the tool interference will no longer occur. It should be noted that if a programmed path comprises, say, two straight line $L_1$, $L_2$, as shown in FIG. 2(A), and the angle $\alpha$ defined by these lines is greater than 90° but less than 180°, then the tool offset path is created through the following sequence: prereading a move command (NC data) in a present block $b_1$ and a move command (NC data) in the next block $b_2$, obtaining a straight line $L'_1$ by offsetting the straight line $L_1$ in the present block $b_1$ by the tool diameter $r_1$ as well as a straight line $L'_2$ by offsetting the straight line $L_2$ of the next block $b_2$ by the tool diameter $r_1$, and computing the coordinates of a point $S_1$ at which the straight lines $L'_1$ and $L'_2$ intersect. A line segment $\overline{S_oS_1}$ connecting $S_1$ and the end point $S_o$ in the preceding block will then be the tool offset path in block $b_1$. By thenceforth executing similar processing, a tool offset path can be created by using NC data indicative of the present block $b_i$ (i=1, 2, . . .) and NC data indicative of the next block $B_{i+1}$. For a case where the angle $\alpha$ is less than 90°, as shown in FIG. 2(B), a point of intersection $S_1$ is found between a straight line $L'_1$, which is obtained by a tool-diameter offset of a straight line $L_1$ in the present block, and a straight line $L_2$ in the next block, and a point of intersection $S_2$ is found between the straight line $L_1$ of the present block and a straight line $L'_2$ obtained by a tool-diameter offset of the straight line $L_2$ in the next block. When this has been accomplished, the line segments $\overline{S_oS_1}$, $\overline{S_1S_2}$ define the tool offset path in block $b_1$.

Figure 3:
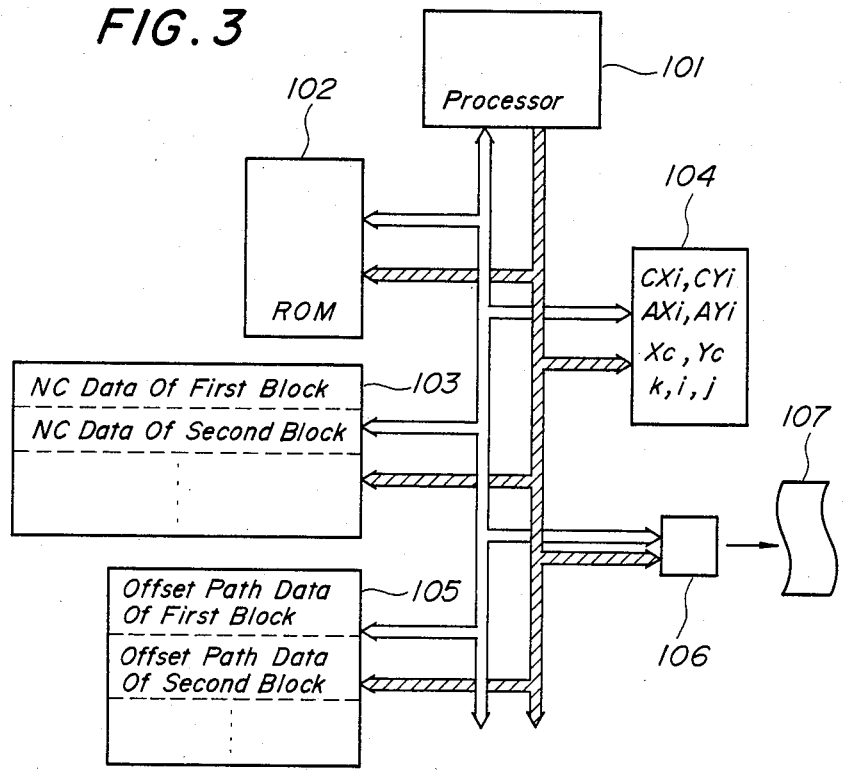
FIG. 3 is a block diagram of an automatic programming apparatus for practicing a tool interference checking method according to the present invention.
Figure 4:
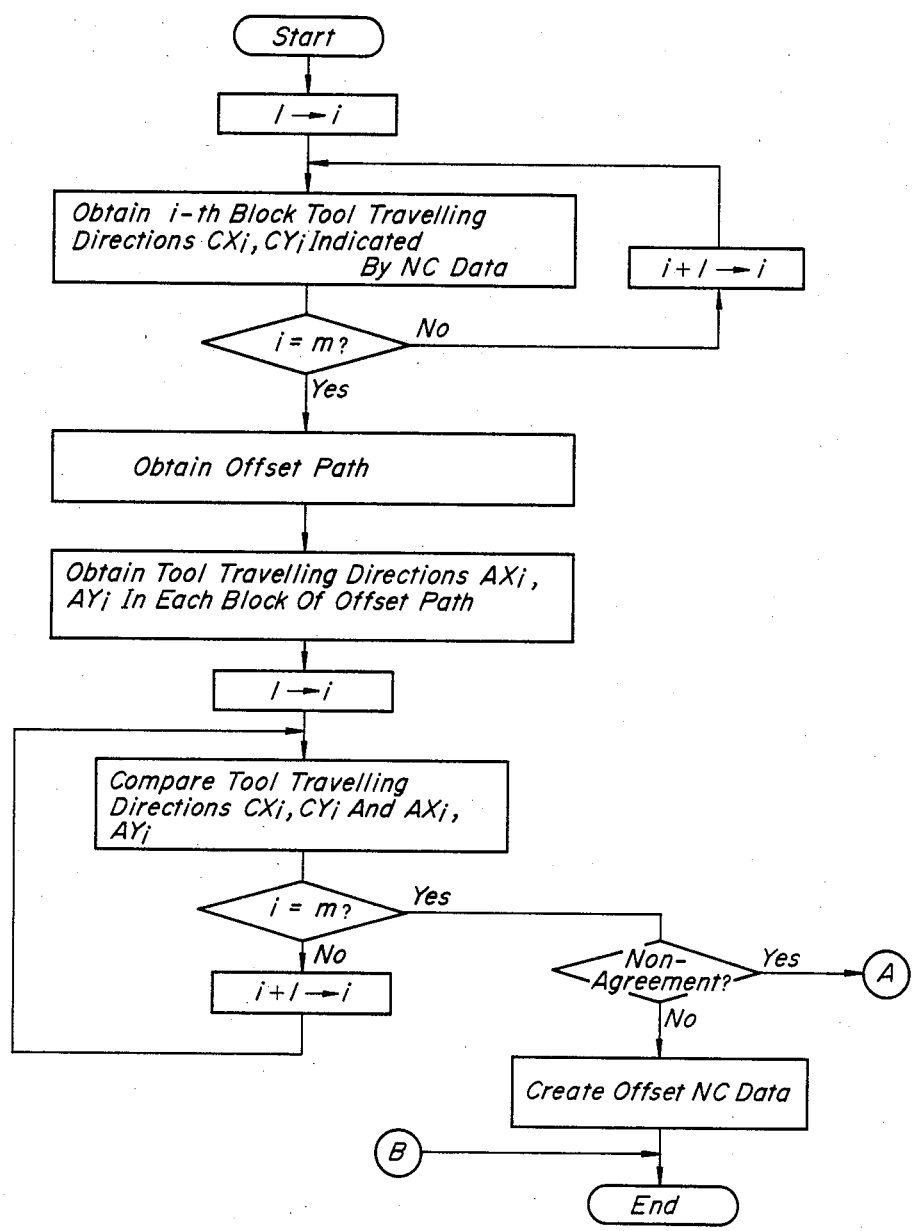
FIGS. 4(A) and 4(B) are flowcharts of tool interference checking processing.
Figure 4:
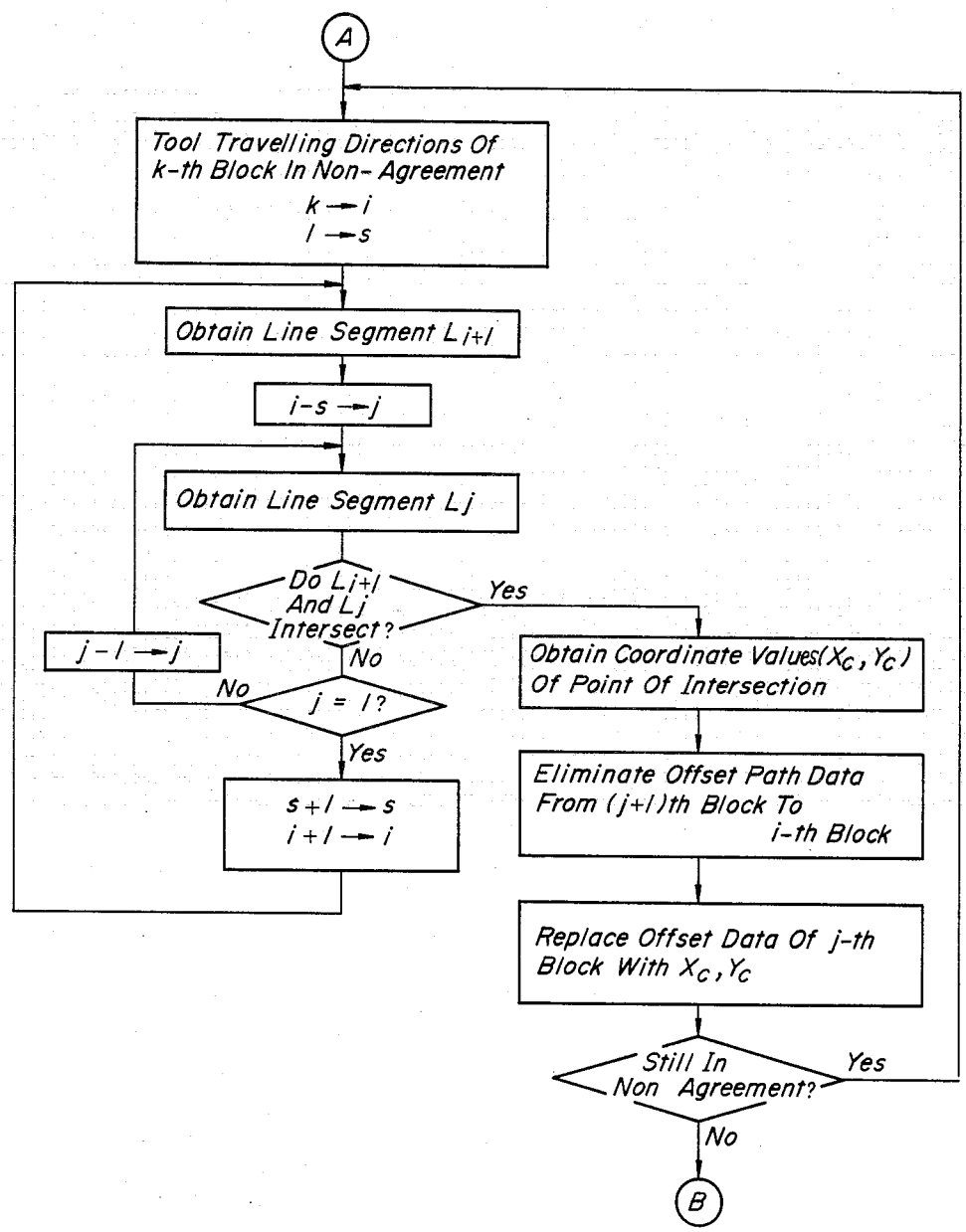

FIG. 3 is a block diagram of an automatic programming apparatus for practicing the tool interference checking method of the present invention.

When creation of NC data by way of automatic programming is completed, a processor 101 starts a tool interference check under the control of a control program. To facilitate the description, it will be assumed that all blocks of created NC data are linear travel data, that the total number of blocks is m, and that the command format is an absolute command format for two axes (X, Y axes) simultaneously.

(a) The processor 101 first performs the operation $1 \rightarrow i$, reads i-th and (i+1)th items of NC data stored in a RAM 103, calculates tool travelling directions $CX_i$, $CY_i$ along the respective axes (X and Y axes) in block $B_i$, and stores these in a working memory 104. It should be noted that the tool travelling directions along the respective axes are obtained based on the relation, in terms of magnitude, between the starting point of the i-th block and the starting point of the (i+1)th block. More specifically, assuming that the starting point coordinate values of the i-th and (i+1)th blocks are $(X_i, Y_i)$, $(X_{i+1}, Y_{i+1})$, respectively, the tool travelling direction $CX_i$ along the X axis will be positive if $X_{i+1} \geq X_i$ holds and negative if $X_{i+1} < X_i$ holds, and the tool travelling direction $CY_i$ along the Y axis will be positive if $Y_{i+1} \geq Y_i$ holds and negative if $Y_{i+1} < Y_i$ holds.

(b) Step (a) is repeated until the travelling directions are found for all blocks. When the travelling directions $CX_i$, $CY_i$ indicated by the NC data in all blocks have been obtained, tool offset path data in all blocks are found through the technique described in connection with FIG. 2, and travelling directions $AX_i$, $AY_i$ in the tool offset path blocks are found through the technique of step (a). It should be noted that the tool offset path data (end point) in each block is stored in a RAM 105, and that the tool travelling directions $AX_i$, $AY_i$ (i=1, 2 . . . m) in each block are stored in the working memory 104.

(c) The processor 101 then performs the operation $1 \rightarrow i$.

(d) Next, the processor 101 goes to the working memory 104 to read out the tool travelling directions $CX_i$, $CY_i$, $AX_i$, $AY_i$ indicated by the NC data and tool offset path data, respectively, in the i-th block. (Note that $CX_i$, $AX_i$ represent tool travelling directions along the X axis, and that $CY_i$, $AY_i$ represent tool travelling directions along the Y axis.) The processor checks whether the tool travelling directions agree for each and every axial direction and stores the result in the working memory 104. Thereafter, the processor checks, in similar fashion, whether the tool travelling directions agree along the respective axes in all blocks.

(e) Next, when the results of the comparison are read out of the working memory 104 and it is found that the tool travelling directions agree for all blocks, a decision is rendered to the effect that tool interference will not occur, and NC data are created on the basis of the tool offset path data, thereby ending the tool checking process.

(f) If the tool travelling directions differ in at least one block (inclusive of a case where tool travelling directions differ along one axis), then a decision is rendered to the effect that tool interference will not occur and NC data correction processing set forth below is executed. It should be noted that the following steps (g) through (m) are steps for obtaining the closed loop LP [see FIG. 1(C)].

(g) Assuming that a block in which the tool travelling direction heads backward is a k-th block, the following operations are performed:

$$k \rightarrow i$$

$$1 \rightarrow s$$

(h) This is followed by calculating a line segment $L_{i+1}$ connecting the end pont of an i-th block and the end point of an (i+1)th block on the tool offset path, and by performing the following operation:

$$i - s \rightarrow j$$

(i) This is followed by calculating a line segment $L_j$ connecting the end point of a (j−1)th block and the end point of a j-th block on the tool offset path, and by determining whether the line segments $L_{i+1}$, $L_j$ intersect.

(j) If the line segments do not intersect, it is determined whether j=1 holds and, if it does not, the operation $$j - 1 \rightarrow j$$

is performed and step (i) is repeated.

(k) If j=1 holds and $L_{i+1}$, $L_j$ do not intersect, then the operations $$s + 1 \rightarrow s$$

i+1→i are performed, the program returns to the step (h), and the foregoing processing is repeated in similar fashion until $L_{i+1}$ amnd $L_j$ intersect.

(m) When the line segments $L_{i+1}$ and $L_j$ intersect, the coordinate values $(X_c, Y_c)$ of the point of intersection $P_c$ are obtained and stored in the working memory 104.

(n) Next, NC data correction processing is carried out. Specifically, offset path data from the (j+1)th block to the i-th block are eliminated. Next, the offset path data in the j-th block are replaced by the coordinate values $X_c$, $Y_c$ of the point of intersection $P_c$ to correct the offset path data, and offset NC data are created based on the corrected offset path data.

(p) Thereafter, the offset path data are output to a tape puncher 106 to create an NC tape 107.

To better understand the foregoing processing, an embodiment will now be described in which the present invention is applied to the case shown in FIG. 1(C).

(a') Travelling direction in an i-th block $B_i$ (i=1, 2 ... 5) designated by NC data is as shown in FIG. 5(A) and is stored in the working memory 104.

(b') Travelling direction in an i-th block $B_i$ designated by a tool offset path is as shown in FIG. 5(B) and likewise is stored in the working memory 104.

(c') When the tool travelling directions in each block $B_i$ of FIGS. 5(A), (B) are compared, it is found that the tool travelling direction heads backward in the third block (k=3).

(d') Accordingly, the operations 3→i, 1→s, i−s(=2)→j are performed, and it is determined whether the line segment $L_{i+1}(=L_4)$ and the line segment $L_j(=L_2)$ intersect.

(e') Since the line segments $L_4$, $L_2$ do not intersect, the operation j−1(=1)→j is performed, and it is determined whether the line segment $L_{i+1}(=L_4)$ and the line segment $L_j(=L_1)$ intersect.

(f') Since the line segments $L_4$, $L_1$ do not intersect and j=1 holds, the operations s+1(=2)→s, i+1(=4)→i are performed, the line sgment $L_{i+1}(=L_5)$ is obtained, the operation i−s→j(=2) is performed, the line segment $L_j(=L_2)$ is obtained, and it is checked whether the line segment $L_{i+1}(=L_5)$ and the line segment $L_j(=L_2)$ intersect.

(g') Since the line segments $L_{i+1}(=L_5)$, $L_j(=L_2)$ intersect, the coordinate values $X_c$, $Y_c$ of the point of intersection $P_c$ are calculated and stored in the RAM 104, the offset path data from the (j+1)th block (third block) to the i-th block (fourth block) are cancelled, and the offset path data in the j-th block, namely the second block, are replaced by $X_c$, $Y_c$ to correct the offset path data.

(i') Thereafter, the correct offset path data are delivered as an output to the tapepuncher 106. It should be noted that the machined profile specified by the offset NC data is as shown by the solid line in FIG. 6, while the tool offset path is as shown by the one-dot chain line in FIG. 6.

Thus, according to the present invention as described above, it is determined whether there is agreement between a tool travelling direction indicated by NC data and a tool travelling direction indicated by a tool offset path, and a decision is rendered to the effect that there is no tool interference when agreement is found, and to the effect that there is tool interference when non-agreement is found. This enables a tool interference check to be performed simply and reliably. Furthermore, a loop is found which includes a block having an offset path different from the travelling direction indicated by the NC data, and the NC data can be created in simple fashion merely by so correcting the data as to eliminate the loop.

The foregoing description relates to a case where the machined profile is composed of straight lines. However, the tool interference check would of course be performed in a similar manner even if a machined profile includes circular arcs. In addition, though it has been described that offset NC data are delivered as an output, an arrangement is also possible wherein NC data are corrected based on the coordinate values $(X_c, Y_c)$ of the point of intersection and tool radius r and then delivered as an output.

Industrial Applicability

According to the present invention, when a tool is moved in accordance with NC data created by an automatic programming apparatus, whether or not tool interference will occur is checked before the fact, and the NC data can be corrected in simple fashion if it is found that tool interference will occur. The present invention is therefore well-suited for application in the field of automatic NC data creation.

We claim:

1. A tool interference checking method for checking whether a tool will interfere with a workpiece when the tool is transported relative to the workpiece to cut the workpiece on the basis of NC data including a number of blocks, said method comprising the steps of:
 (a) obtaining a tool travelling direction indicated by the NC data in each of the blocks;
 (b) obtaining a tool offset path by executing tool offset processing based on a diameter of the tool and each block of the NC data;
 (c) obtaining a tool travelling direction in each block of the tool offset path;
 (d) comparing, for each and every block, the tool travelling direction indicated by the NC data and the tool travelling direction indicated by the tool offset path;
 (e) determining that the tool will not interfere with the workpiece when the directions compared in step (d) agree in all blocks;
 (f) determining that the tool will interfere with the workpiece if the directions compared in step (d) do not agree in at least one block;
 (g) obtaining, when the tool will interfere with the workpiece at an intersection of two segments of the tool offset path, a loop which starts from and ends at the intersection and includes a segment specified by the block in which the tool travelling directions are in non-agreement; and
 (h) correcting said NC data so as to eliminate said loop.

2. A tool interference checking method for checking whether a tool will interfere with a workpiece when the tool is transported relative to the workpiece to cut the workpiece on the basis of NC data including a number of blocks, said method comprising the steps of:
 (a) obtaining a tool travelling direction indicated by the NC data in each of the blocks;
 (b) obtaining a tool offset path by executing tool offset processing based on a diameter of the tool and each block of the NC data;

(c) obtaining a tool travelling direction in each block of the tool offset path;
(d) comparing, for each and every block, the tool travelling direction indicated by the NC data and the tool travelling direction indicated by the tool offset path;
(e) determining that the tool will not interfere with the workpiece when the directions compared in step (d) agree in all blocks;
(f) determining that the tool will interfere with the workpiece if the directions compared in step (d) do not agree in at least one block;
(g) obtaining, when the tool will interfere with the workpiece at an intersection at which two segments of the tool offset path intersect each other, a loop which starts from and ends at the intersection and includes a segment specified by the block in which the tool travelling directions are in non-agreement;
(h) correcting the tool offset path so as to eliminate said loop; and
(i) creating NC data on the basis of said corrected tool offset path.

* * * * *